(12) United States Patent
Findleton et al.

(10) Patent No.: US 7,529,967 B2
(45) Date of Patent: May 5, 2009

(54) METHOD AND SYSTEM FOR NETWORK STORAGE DEVICE FAILURE PROTECTION AND RECOVERY

(75) Inventors: Iain B. Findleton, Baie d'Urfe (CA); Mathieu Dube, Montreal (CA); Gautham M. Sastri, Montreal (CA)

(73) Assignee: Rackable Systems Inc., Montreal (CA)

( * ) Notice: Subject to any disclaimer, the term of this patent is extended or adjusted under 35 U.S.C. 154(b) by 632 days.

(21) Appl. No.: 10/980,186

(22) Filed: Nov. 4, 2004

(65) Prior Publication Data
US 2006/0107096 A1    May 18, 2006

(51) Int. Cl.
*G06F 11/00* (2006.01)

(52) U.S. Cl. .................. 714/6; 714/5; 714/7; 714/42

(58) Field of Classification Search .......... 714/5, 714/6, 7, 8, 42
See application file for complete search history.

(56) References Cited

U.S. PATENT DOCUMENTS

| | | | |
|---|---|---|---|
| 5,802,345 A * | 9/1998 | Matsunami et al. | 703/27 |
| 6,148,414 A * | 11/2000 | Brown et al. | 714/6 |
| 7,159,150 B2 * | 1/2007 | Kenchammana-Hosekote et al. | 714/6 |
| 2002/0059497 A1 * | 5/2002 | Komori | 711/111 |
| 2004/0153728 A1 * | 8/2004 | Suzuki et al. | 714/6 |
| 2005/0246345 A1 * | 11/2005 | Lent et al. | 707/10 |
| 2005/0289386 A1 * | 12/2005 | Tawil et al. | 714/6 |
| 2006/0059408 A1 * | 3/2006 | Chikusa et al. | 714/770 |

* cited by examiner

*Primary Examiner*—Christopher S McCarthy
*Assistant Examiner*—Joseph D Manoskey
(74) *Attorney, Agent, or Firm*—Ogilvy Renault LLP

(57) ABSTRACT

A method for executing a write request in a clustered computing environment, comprising a plurality of computers connected in a network, including at least one client computer accessing data blocks stored on a first storage device of a shared aggregated pool of storage devices. Data blocks stored on the first storage device are linked to data blocks stored on at least one second storage device of the pool by error recovery data stored on a third storage device of the pool. When a client computer sends a write request to the first storage device for a new data block to be stored at an address on the first storage device, the new data block is written at the address on the first storage device. New error recovery data is calculated for the data block and is written to the third storage device.

16 Claims, 13 Drawing Sheets

| SCATTERING TABLE | | | |
|---|---|---|---|
| LBA INDEX | BLOCK 1 | BLOCK 2 | BLOCK 3 |
| 00 | 0 | 1 | 2 |
| 01 | 2 | 0 | 1 |
| 10 | 1 | 2 | 0 |

131

METHOD AND SYSTEM FOR NETWORK STORAGE DEVICE FAILURE PROTECTION AND RECOVERY

FIELD OF THE INVENTION

The invention relates to mechanisms for protection and recovery from network storage device failure. More specifically, it relates to an error-recovery scheme used in a clustered computing environment.

BACKGROUND OF THE INVENTION

Current practice in storage networking implementations is to rely on hardware and software implementations of the well known Redundant Array of Independent Disks (RAID) technology to insulate computing applications and the data used by these applications against interruption, or the loss of or damage to the data required by these applications, occasioned by the failure of the storage devices used to hold the data. Hardware and software RAID implementations are effective in delivering protection against single device failure, and may in some circumstances, be used to provide protection against multiple device failure.

Storage devices are typically connected to computer systems that are used to run the applications that make use of data stored on the storage devices. The incidence of a failure of the computer systems can, independent of any possible failure of the storage devices, occasion the loss of, or damage to, data that is being used by the application at the time of the computer failure. Current practice is to guard against the results of failures of the computer system through the use of journaling schemes that record the list of necessary parameters of incomplete storage operations. Following recovery of the computer system after a failure, such journals can be replayed to restore the contents of the storage devices to a known state, allowing applications to resume processing at the point of failure.

Well-known RAID schemes make use of the parity computation algorithm to implement data protection in the face of device failure. In typical implementations, such as the one shown in the prior art embodiment of FIG. 1, when a block of binary data is written to a RAID controller, the controller will use the contents of one or more blocks of data previously or concurrently written to the controller to compute a parity block, and will then write the original data and the computed parity block to physical storage devices 13. Insulation against the failure of a storage device in the prior art RAID configuration is made possible by ensuring that the parity blocks reside on a storage device that is different from the device or devices that hold the blocks used to compute the parity block. Should a device that holds the original data fail, the RAID controller can still respond to an access request by reading the parity block associated with the original data, along with the other block that form the RAID block stripe group, recover the data from the failed device using the parity algorithm, and send it back to the requesting storage client.

In a standard RAID scheme, the parity blocks are distributed using one or two straightforward schemes. The RAID Level 4 (RAID 4) scheme puts all of the parity data on a designated storage device, while on a RAID Level 5 (RAID 5) scheme, the parity blocks are scattered across all of the storage devices in the RAID pool using a round robin style algorithm. In prior art RAID schemes there is only one storage controller, which is equivalent to a single storage server in the context of the current invention. The standard RAID distribution scheme does not work in the context of a clustered computing environment because the clustered storage server pool contains more than one server, and may contain a large number of storage servers. The distribution of the parity computations over many servers requires that each server be able to locate both the data blocks needed for the computation, and be able to locate the parity blocks, both of which are distributed across all of the storage servers.

There exists therefore a need for a scalable error-recovery scheme against storage device failure to be used in a clustered computing environment.

The RAID-5 scheme, widely used in both hardware and software implementations available in many products used in data storage applications, operates on a pool of storage devices by applying the RAID algorithm. Configuration of a RAID-5 implementation involves specification of the RAID stripe size. The implementing hardware or software scheme than scatters the data blocks and associated parity block over the physical storage devices in a manner that guarantees that in the event of the failure of one of the storage devices, the remaining devices will be able to provide all of the data blocks and parity blocks needed to reconstruct the data on the failed storage device.

RAID-5 implementations suffer from severe performance problems when processing write operations on data blocks. In order to update a single data block on a RAID-5 based storage pool with a stripe size of N, the implementing hardware or software must first read the N−2 other blocks in the stripe, compute the new parity block, and arrange to write the new contents of the data block and the parity block to their respective storage devices.

An additional complication is that steps must be taken to ensure that the contents of the other data blocks in the stripe are not modified during the computation of the parity block. These characteristics of the RAID-5 implementation result in increased latency of write operations which manifest themselves as very poor storage system write performance when compared to that of a system that simply writes the block to a single disk unit.

There exists therefore a need for a method of data protection and recovery on storage pools providing an improved storage system write performance.

SUMMARY OF THE INVENTION

Accordingly, it is an object of the present invention to provide an error-recovery scheme against storage device failure that is scalable so that it may be used in a clustered computing environment.

According to a first broad aspect of the present invention, there is provided a method for executing a write request in a clustered computing environment, comprising a plurality of computers connected in a network, including at least one client computer accessing data blocks stored on a first storage device of a shared aggregated pool of storage devices. The method comprises: linking the data blocks stored on the first storage device to data blocks stored on at least one second storage device of the pool by error recovery data stored on a third storage device of the pool; the client computer sending a write request to the first storage device for a new data block to be stored at an address on the first storage device; writing the new data block at the address on the first storage device; calculating new error recovery data for the data block; and writing the new error recovery data to the third storage device, wherein data is transmitted over the network to the third storage device to enable the writing.

According to another object of the present invention, an improved method eliminating the performance-limiting characteristics of the standard RAID-5 algorithm is provided, by eliminating the stripe against modification during the computation of the error recovery block, and eliminates the need to read the other blocks in the stripe in order to carry out the error recovery calculation.

Accordingly, there is provided a method for executing a write request in a computing environment including a client computer accessing data blocks stored on an aggregated pool of n storage devices, comprising: the client computer providing the write request comprising one or more new data blocks to be stored on the aggregated storage pool; dividing each of the one or more new data blocks into n−1 sub-blocks; calculating an error recovery data block for each one of the new data blocks from the n−1 sub-blocks; storing the n−1 sub-blocks and the error recovery data block on the storage devices by writing a block to each of the storage devices.

According to yet another object of the present invention, there is provided a method for executing a read request in a computing environment including a client computer accessing data blocks stored on an aggregated pool of n storage devices, the data blocks being divided into n−1 sub-blocks and an error recovery data block, the blocks being striped across the storage devices according to a scattering scheme, such that each one of the sub-blocks is written to a different storage device, comprising: a client providing a request to read a data block stored on the aggregated pool of storage devices; if no failure of a storage device is detected, using the scattering scheme to determine the location of the n−1 sub-blocks on the storage devices; reading the n−1 sub-blocks; assembling the requested data block from the n−1 sub-blocks; if one of the storage devices storing one of the n−1 sub-blocks fails, using the scattering scheme to determine a location of the n−2 sub-blocks on the storage devices and a location of the error recovery block; reading the n−2 sub-blocks and the error recovery block; using an error recovery algorithm to recover the sub-block stored on the failed storage device; assembling the requested data block from the n−2 sub-blocks and the recovered sub-block; and transmitting the assembled data block to the client.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

In the context of a clustered computing environment, a single application may run on many computers simultaneously, all the while accessing data stored on a shared storage resource, which itself is constructed from multiple computers connected to distinct pools of storage devices. The current invention is a scheme which insulates the applications and data in a clustered storage environment against the failure of individual storage servers and provides for the orderly recovery of the failed storage servers into the aggregated storage pool.

Figure 1:
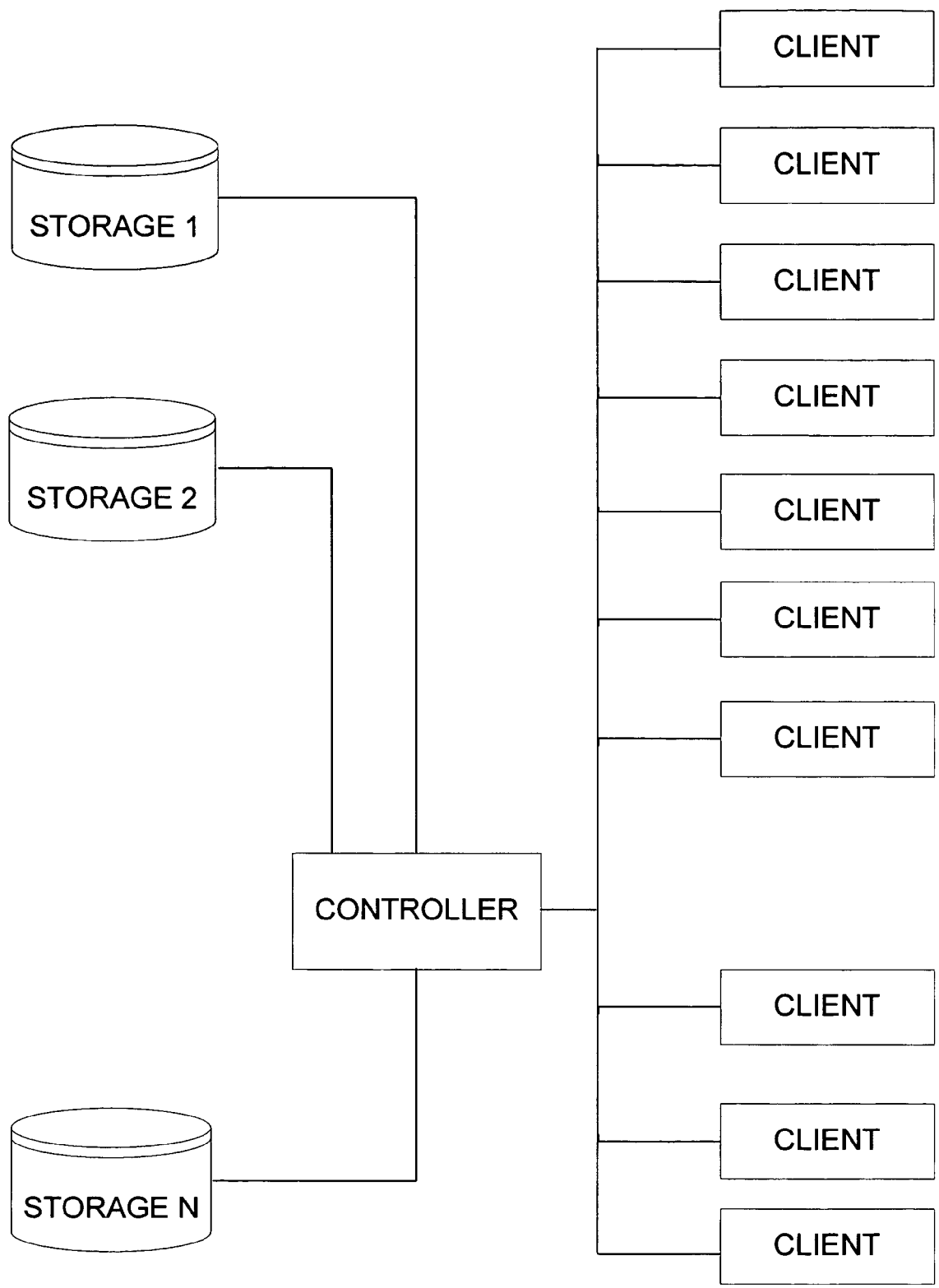
FIG. 1 is a block diagram of a prior art networked storage environment having a central controller.
Figure 2:
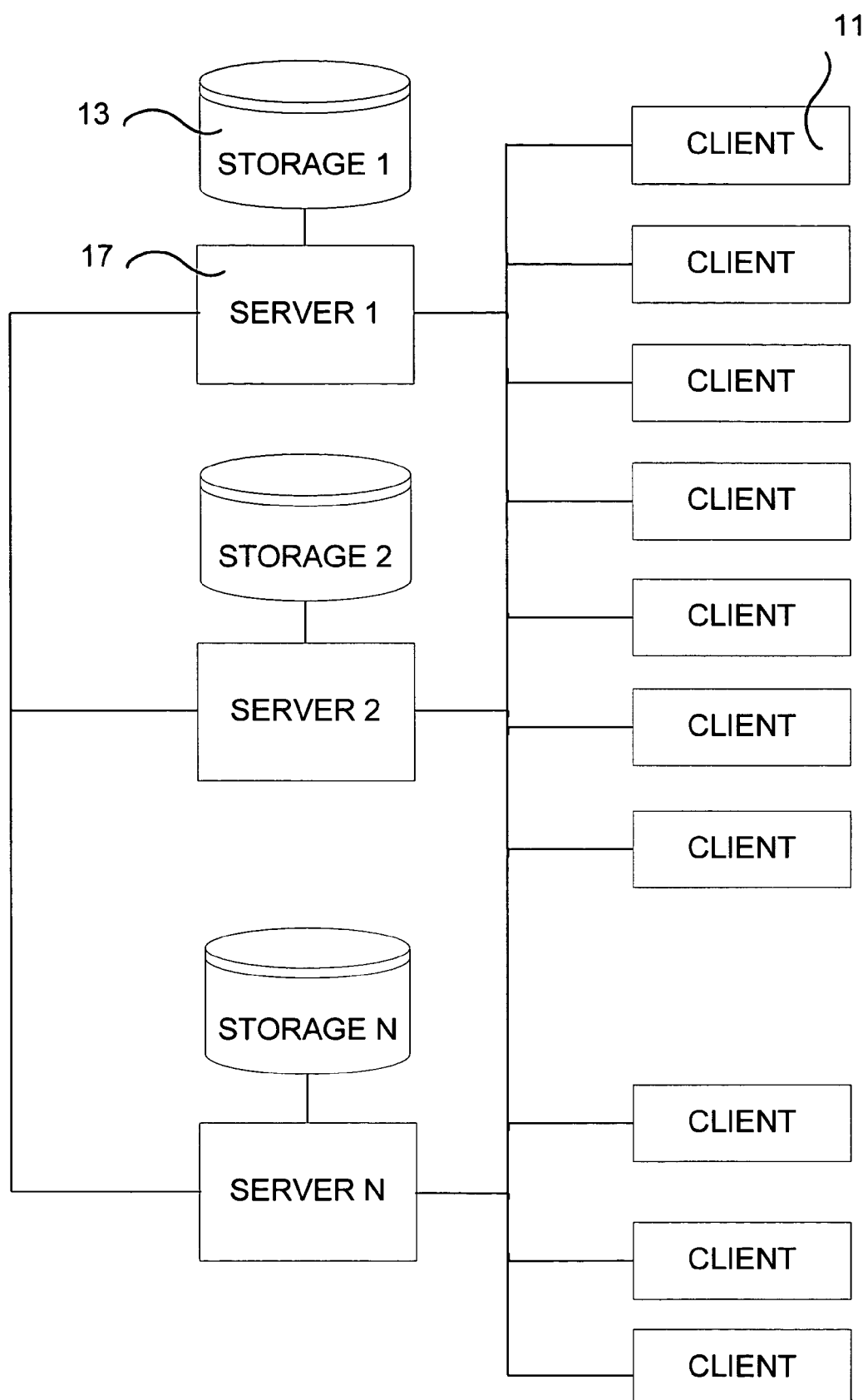
FIG. 2 is a block diagram of a clustered computing environment having dedicated storage serves.

Referring to FIG. 2, a networked storage environment consists of a number of independent computers 17 which are themselves connected directly to physical storage devices 13, and which are connected to one or more client computers 11 which are running applications that are accessing the data stored on the physical storage devices 13. Such an array of computers connected together with a computer communications network fabric is known as a cluster. The computers connected to the storage devices 13 are termed storage servers 17, while the computers that are running the applications which access the data on the storage servers 17 are termed storage clients 11. Logically, the storage servers 17 and storage clients 11 are separate, distinct, independent computers assembled into a computing cluster by connecting them together using a computer communications network that enables the transfer of data between the clients 11 and the servers 17. In physical manifestations of this type of system, the computers that act as the clients and those that act as the servers may or may not be the same physical devices.

In the usual and preferred implementation of this type of storage pool, the storage devices 13 are either individual disk storage units, or aggregations of such devices into storage units in the form of high performance disk arrays. Other types of storage devices 13 could also be used, including, but not limited to, video display devices, solid state memory arrays, storage systems built using magnetic tape units, and network communications devices.

Within the server pool, the storage servers 17 are connected to each other through a server network. The storage devices 13 themselves are connected to the storage servers 17 in a manner that enables the bidirectional data transfer between a server 17 and at least one of the storage devices 13. The storage devices 13 may also be connected to more than one of the storage servers 17 using a network, which may or may not be the same network as the server network. Examples of the kind of networks that are typically used to provide the connection between the servers 17 and the storage devices 13 include, but are not limited to, networks built on Fibre Channel technology, Ethernet networks, InfiniBAND networks, and a number of high performance networks that are specifically designed for use with disk subsystems.

The server network itself may be the same physical network as the client network. In some feasible implementations, all of the components of the storage pool, as well as all of the client computers 11, are connected together using the same physical network infrastructure. The use and operation of the invention that is the object of the present patent is not modified or changed by the nature or design of the physical network infrastructure.

The current invention addresses networked storage environments in which the physical storage 13 resources of more than one storage server 17 are aggregated to form a combined virtual storage space that is accessed by one or more storage clients 11. The size of the aggregated storage pool is determined by the sum of the storage space made available for aggregation by the individual storage servers 17 in the cluster. Each of the storage servers 17 in the cluster is uniquely responsible for the processing of data access operations initiated by the storage clients 11 of the cluster that involve the data that is held on the physical storage 13 connected to the server 17 itself. For example, in a cluster with 10 storage servers 17, each of which presenting 100 MegaBytes of physical storage 13 for aggregation, will produce a virtual storage space of 1,000 MegaBytes of storage to storage clients 11. Data stored on the physical storage devices 13 will be accessed by applications running on the storage clients 11 based on a logical byte address that ranges from 0 through 999,999,999.

In the usual terminology applied to storage systems, the storage devices provide storage space in units of blocks. A block is an unlabeled aggregation of bytes, typically of size 512 bytes in length, but which may be of any length appropriate to the storage device characteristics. Storage devices address the blocks using a Logical Block Address (LBA) which ranges from a value of 0 through 1 minus the number of blocks available on the storage pool.

In the preferred embodiment of the present invention, the storage server 17 responsible for processing a data access request for a specific block address in the logical storage space is determined by the algorithm:

server=LBA value/(number of servers*blocks per server)

The result of this calculation, done in integer arithmetic, is a number between 0 and (number of servers−1) that identifies the storage server 17 that holds the piece of data defined by the LBA value. A suitable piece of software running on the storage client 11, such as a Global File System (GFS) software interface, can direct the access request to the appropriate storage server 17, which can act on the request and return the result to the storage client application.

The present invention addresses the consequences of a failure of a storage server 17 in a networked storage environment that implements storage aggregation through some scheme. The immediate consequence of the failure of a storage server 17 is that the data held on the physical storage 13 resources of the failed server 17 can not be accessed by applications running on the storage clients 11. Attendant to this consequence are a number of possible resulting negative consequences for the application or applications running on the storage clients 11. These consequences may include the failure of the applications themselves, corruption of data structures due to the continued availability of other storage servers 17 in the cluster, and loss of data sent to the failed server but not actually written to the failed server's storage devices.

The present invention is a scheme that responds to failures of storage servers 17 that are arranged in an aggregated storage pool configuration and enables the continued, uninterrupted operation of the applications on the storage clients 11. The present invention makes use of the characteristics of the well known mathematical operation on binary arithmetic:

If P=A XOR B XOR C . . .

then A=P XOR B XOR C . . .

and B=P XOR A XOR C . . .

This mathematical relationship makes use of the characteristics of the logical XOR operation of binary arithmetic which is defined by the following result table:

| Operator | 1 | 1 | 0 | 0 |
|---|---|---|---|---|
| Operand | 1 | 0 | 1 | 0 |
| Result | 0 | 1 | 1 | 0 |

For any number of successive blocks of binary data, once the so called Error-Recovery Data Block (ERDB) is computed according to the above formula, the contents of any of the individual blocks can be recovered by applying the algorithm to the ERDB and the remaining data blocks.

The invention implements ERDB-based data protection by distributing responsibility for the ERDB computation across more than one storage server 17, and for the distribution of the data recovery function over more than one server.

In the preferred embodiment of the present invention, the block distribution algorithm is defined by the following equation:

stripe_id=floor((servers*lba+tid)/(servers−1))

pd_idx=(servers−1−stripe_id)MOD servers where the stripe_id is a number that determines which data blocks are used to compute an ERDB for the specified data block is to be stored, lba is the logical block address of the data block that is being written to the aggregated storage pool, servers is the number of storage servers 17 in the aggregated storage pool, tid is an index value that ranges from 0 through (servers−1) and identifies the storage server 17 processing the write request, and pd_idx is an index value that ranges from 0 through (servers−1) and identifies the storage server 17 that is to handle the ERDB computation. The floor mathematical function is a standard function that returns as its result the value of its parameter rounded down to the nearest whole integer.

While in the preferred embodiment of the present invention stripe_id indicates data blocks from a single server which are used to calculated the ERDB, in alternative embodiments data blocks from a plurality of servers could be used for the ERDB computation.

Figure 3:
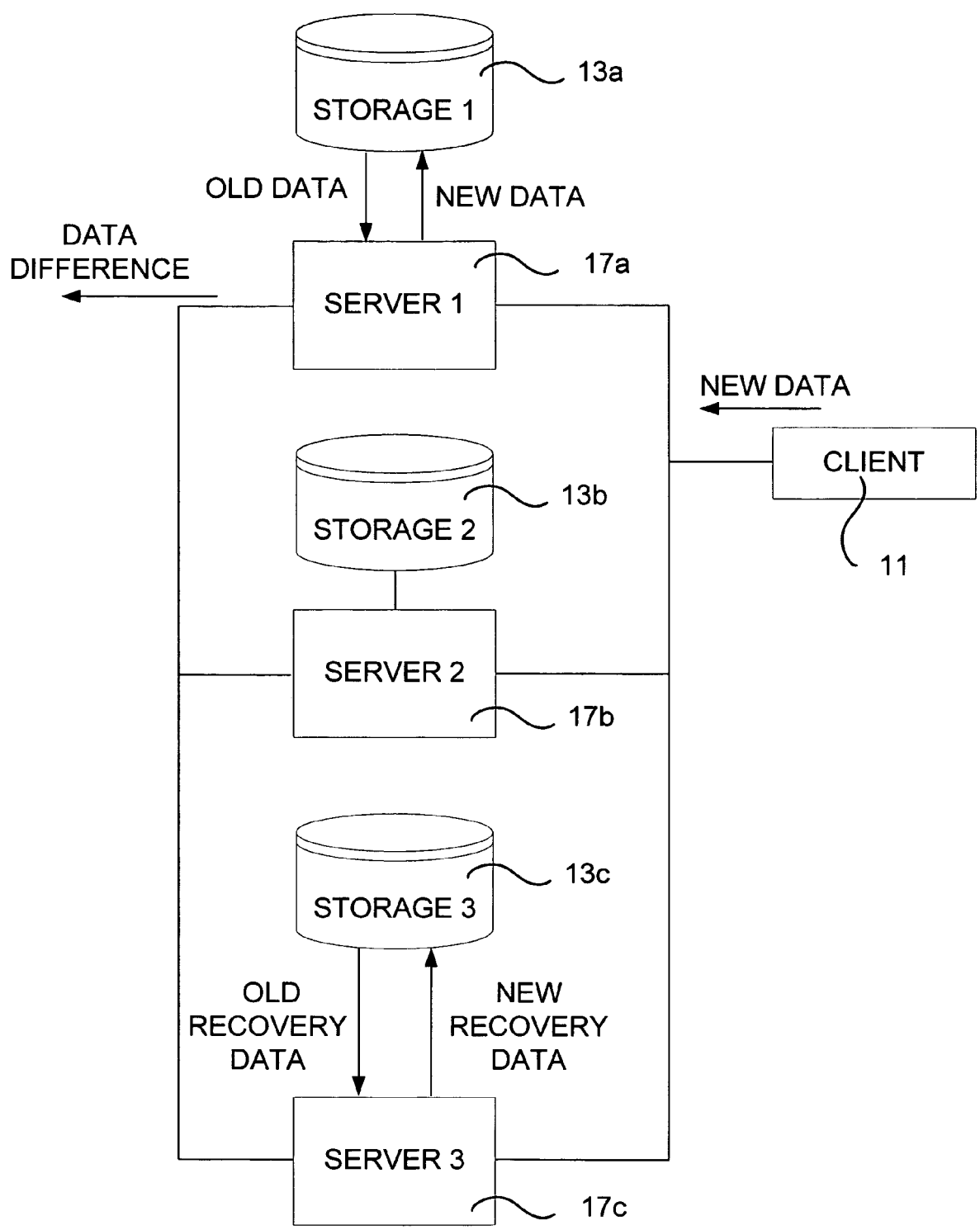
FIG. 3 is a block diagram of a system for error recovery according to a preferred embodiment of the present invention.
Figure 7:
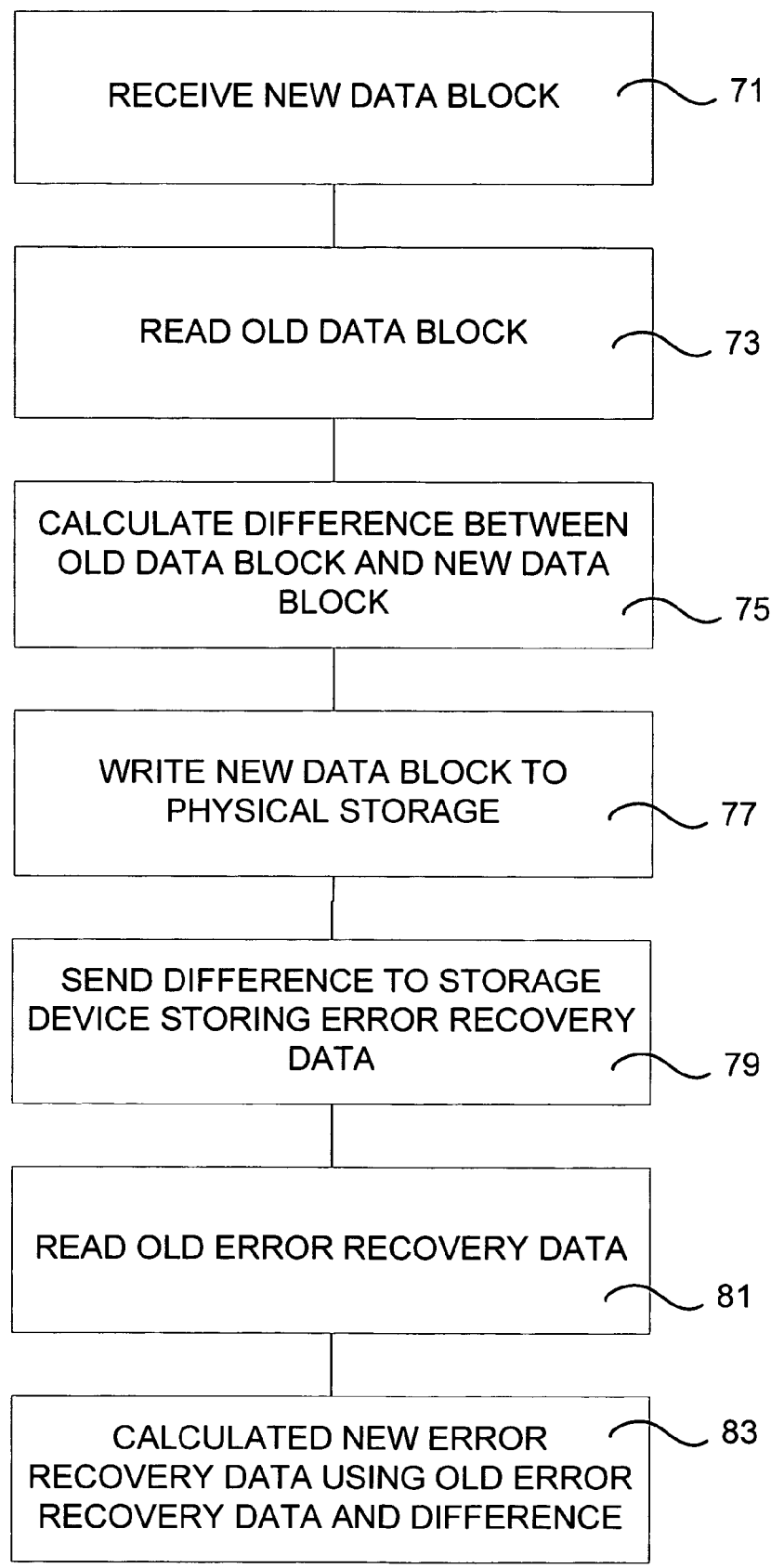
FIG. 7 is a flow chart of a method for executing a write request in a clustered computing environment according to one embodiment of the present invention.

With respect to FIG. 3 and FIG. 7, the steps followed during a data access operation that writes a block of data according to the preferred embodiment of the present invention are as follows:

In a first step, a client application on a client 11 initiates a write request of a data block. In the preferred embodiment, the storage system aggregation layer determines the index value of the target storage server 17, according to the algorithm described previously, and forwards the request to the appropriate storage server 17. In alternative embodiments, which will be described later, the write request may be forwarded to more than one storage server 17.

The new data block to be written is received, as per step 71, at the storage server 17 associated with the storage device 13. In the preferred embodiment, the new data block is sent to the storage server 17a associated to the storage device 13a storing the old data block.

In step 73, the storage server 17a reads the old data block from the storage device 13a. The storage server 17a then compares the new data block and the old data block and, as shown in step 75, calculates a difference between the old data block and the new data block.

The new data block is written to the physical storage device 13a of the target server 17a in step 77.

The storage server 17a then determines the index value of the server which will handle the error recovery computation, which is the server 17c storing the error recovery data.

In the preferred embodiment of the present invention, and according to step 79, a copy of the difference between the old data block and the new data block is sent to the storage server 17c which will perform the error recovery computation. While preferably only the difference between the data blocks is transmitted from one server to the other, the storage server 17a could send the entire new data block to the server storing the error recovery data. Sending only the difference provides the advantage of reducing traffic between the two servers 17 and provides for a more efficient computation of the new error recovery data.

The server 17c, receives the data difference and in step 81, retrieves the old recovery data from the storage 13c. Using the data difference and the old recovery data, in step 83, the server 17c then computes the new error recovery data for the new data block and stores it on its local storage 13c.

This sequence of operations results in the correct ERDB for a given data block being saved on the storage server 17 that holds the ERDB block for a specified data block because of the mathematical relation:

$$new\_ERDB = (new\_data\ XOR\ old\_data)\ XOR\ old\_ERDB$$

where new_data and old_data are the new and previous contents of the data block known to its storage server 17, and old_ERDB is the contents of the ERDB block on the storage server 17 responsible for the ERDB block for the relevant data block. The scheme that embodies the current invention, therefore, is able to maintain the correct contents of the ERDB information for a specified data block first computing the difference block using the mathematical formula:

$$difference = new\_data\ XOR\ old\_data$$

on the storage server 17 that receives the write request for a data block, then sending the difference block to the storage server 17 that is responsible for the ERDB for the data block, which then performs the operation:

$$new\_ERDB = difference\ XOR\ old\_ERDB$$

and then updates the ERDB on its local storage.

Figure 4:
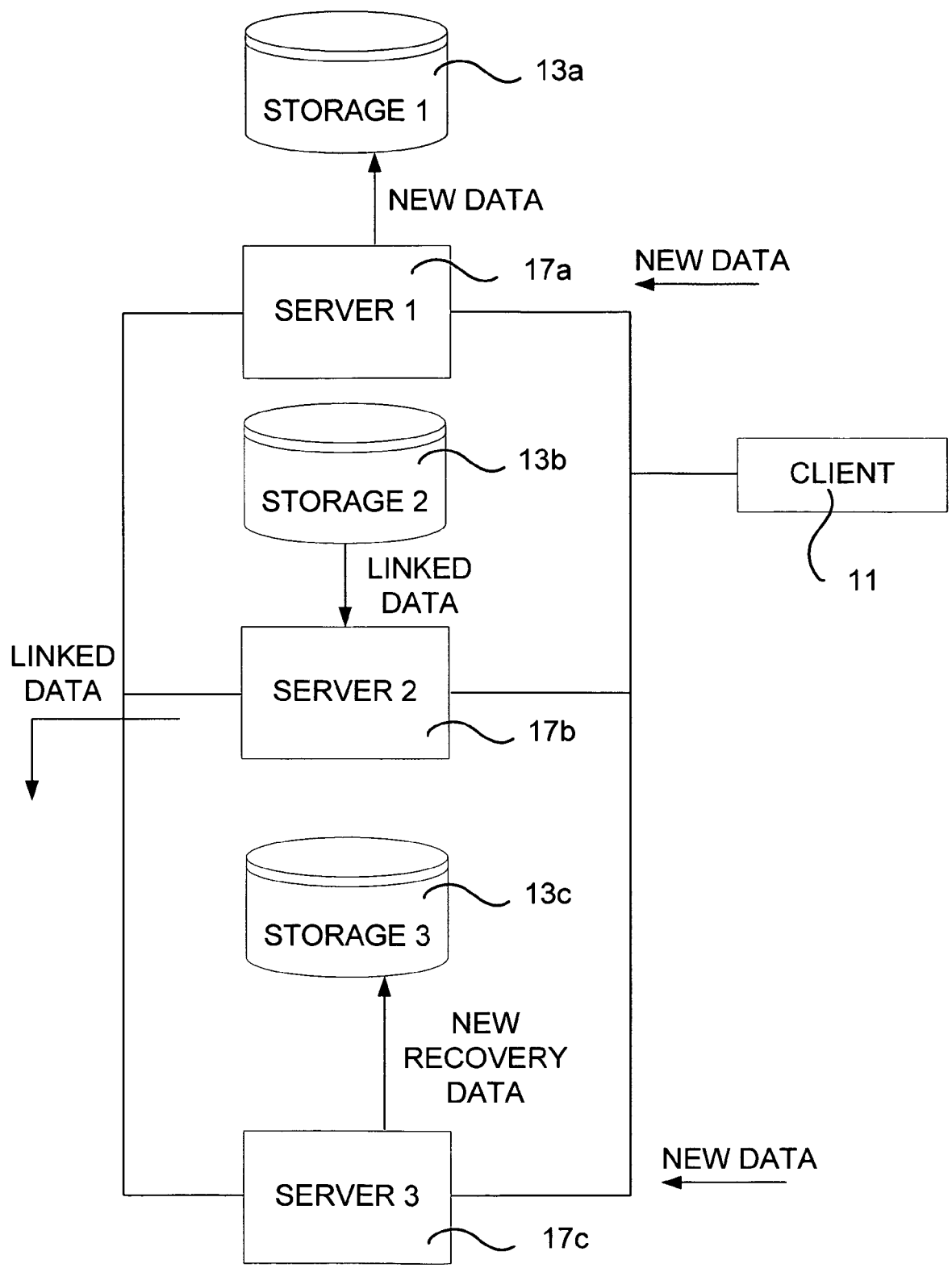
FIG. 4 is a block diagram of a system for error recovery according to a second embodiment of the present invention.

Now, with respect to FIG. 4, another embodiment of the present invention will be described. The client 11 initiating the write request for a data block sends the request to a target storage server 17a and to the storage server 17c. The storage server 17a is the server on which the new data block will be written, while the storage server 17c is the server on which error recovery data for the old data block has be written. The storage server 17a writes the new data received to the physical storage device 13a. The storage server 17b retrieves from the physical storage device 13b the data block linked with the old data and sends the link data to the storage server 17c. The storage server 17c uses the link data and the new data to compute new error recovery data which is then stored on the physical storage device 13c.

Figure 5:
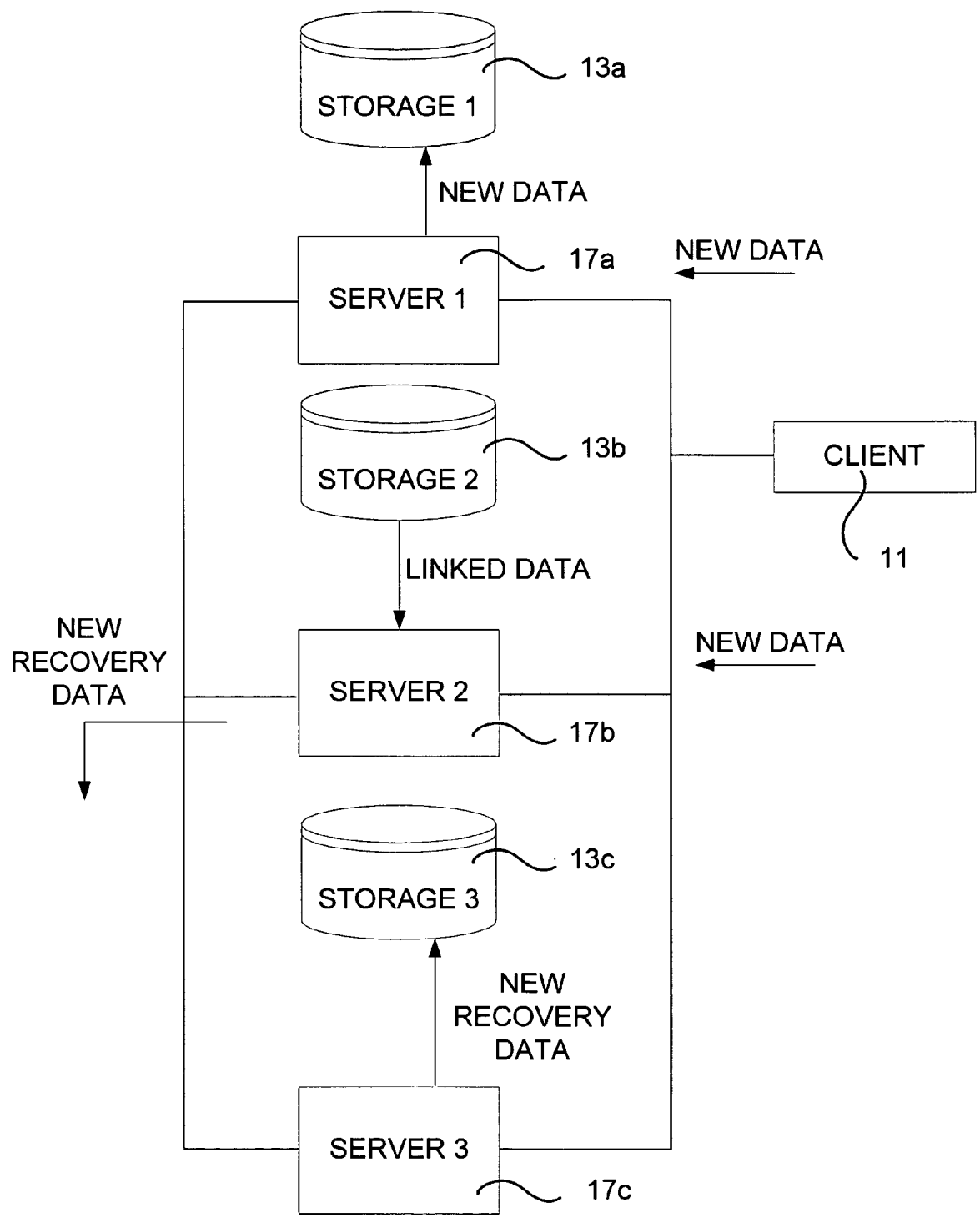
FIG. 5 is a block diagram of a system for error recovery according to a third embodiment of the present invention.
Figure 6:
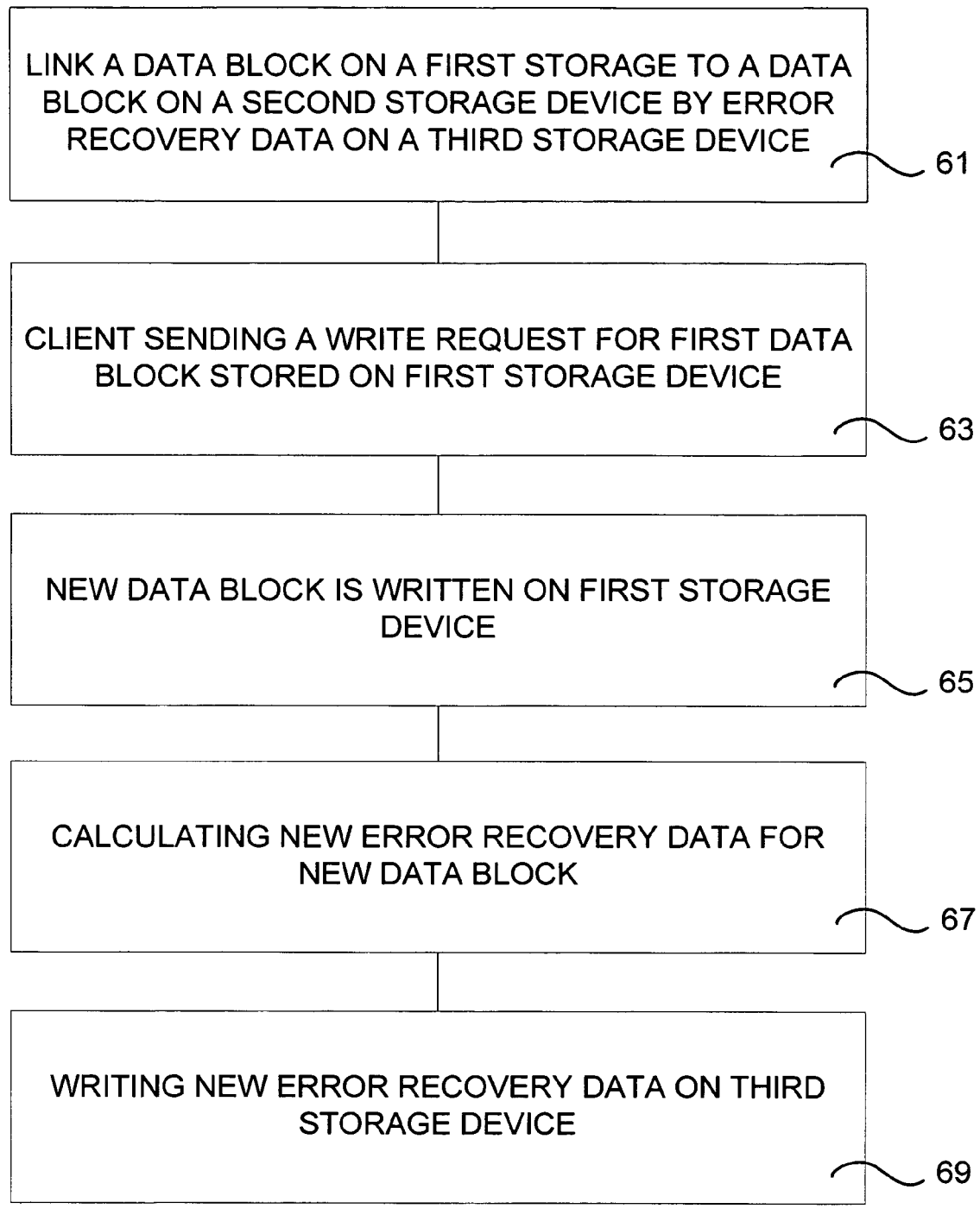
FIG. 6 is a flow chart of a method for executing a write request in a clustered computing environment according to the present invention.

In yet another embodiment of the present invention, as shown in FIG. 5, the client 11 initiating the write request for a data block sends the request to a target storage server 17a and to the storage server 17b. The storage server 17a writes the new data received to the physical storage device 13a. The storage server 17b retrieves from the physical storage device 13b the data block linked with the old data and it uses the link data and the new data to compute a new error recovery data block. The server 17b then sends the new error recovery data block to the server 17c which will store it on the physical storage device 13c.

Figure 8:
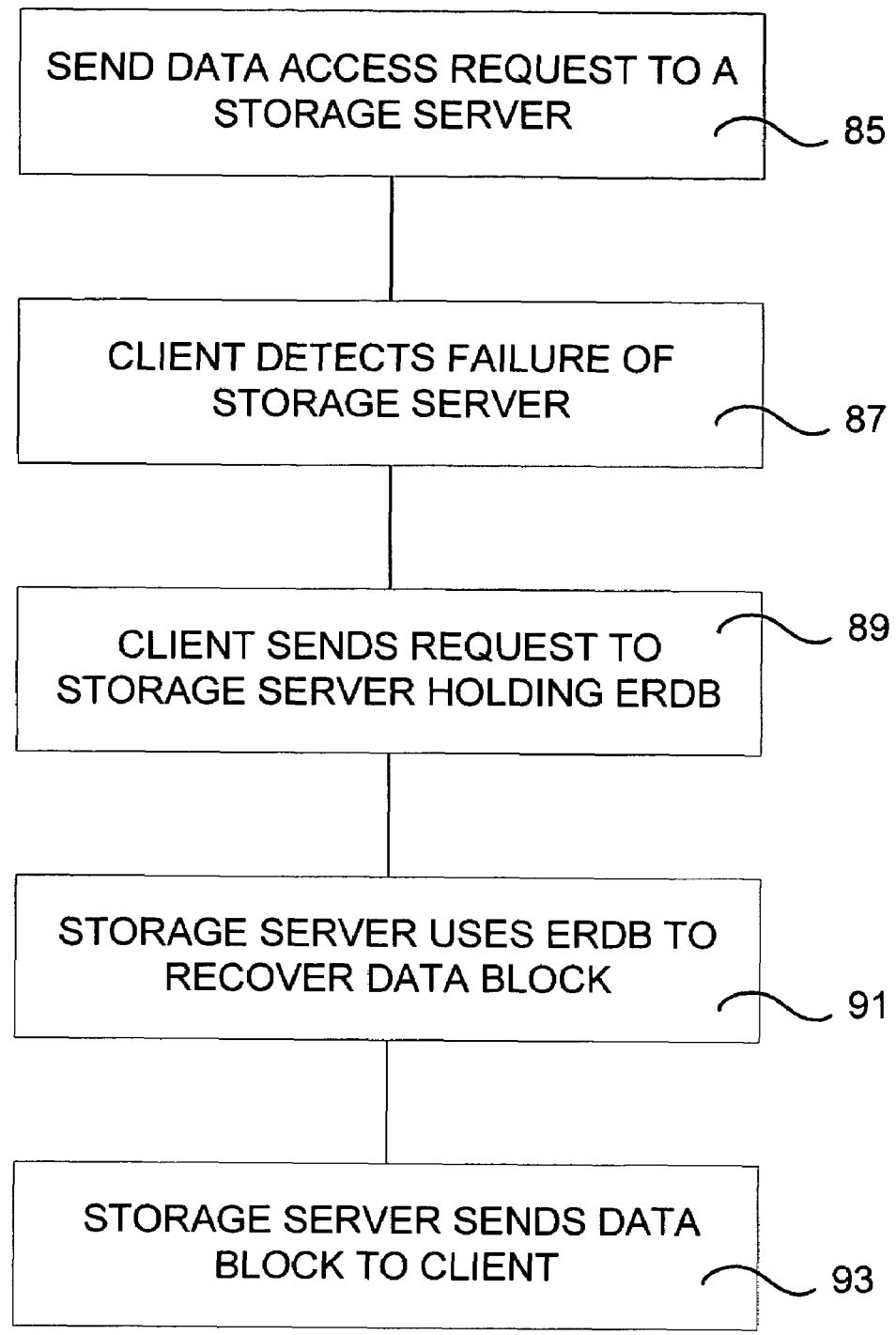
FIG. 8 is a flow chart of a method of recovery from single storage device failure according to the present invention.
Figure 9:
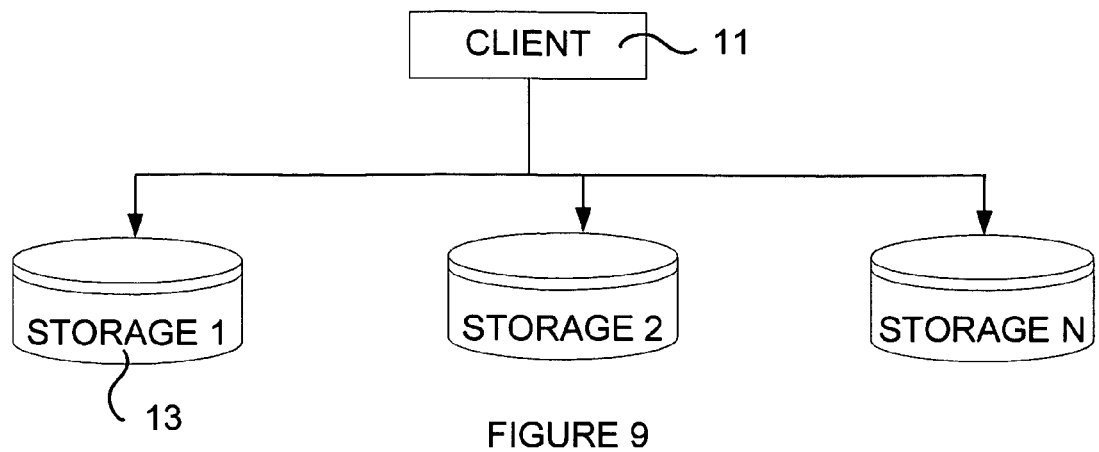
FIG. 9 is a block diagram of a first system architecture in which a client communicates directly with the pool of storage devices.

Using a scheme as any of the ones described above with a minimum of 3 servers, the failure of any one of the servers can be rendered transparent to the operations of the storage clients 11 using a software implementation that behaves as shown in FIG. 8.

In step 85, after a client application initiates an access request for a specific block of data, a storage system aggregation layer determines the index value of the target storage server 17 that holds the data block. In step 87, the client detects a failure of the target storage server 17 because the access request fails.

In step 89, the client then contacts the storage server 17 that holds the ERDB for the requested data. Then, as shown in step 91, the server 17 responsible for that particular ERDB can then recover the actual block of data using the error recovery algorithm.

Finally, in step 93, the server responsible for the error recovery returns the requested data block to the client 11.

Important features of the scheme that is the basis of the current invention are that the calculation of the error recovery data and the storage of the ERDB for a specified data block can be performed asynchronously with respect to the client-initiated write operation, and that the scheme is scalable with respect to the number of storage server 17 nodes. Being able to perform the error recovery data computation asynchronously means that the client 11 does not have to wait for the server 17c to complete its computations before receiving an acknowledgement from the storage server 17a that the write operation it initiated has completed. Since, under normal operations, when a storage server 17a failure has not been detected, the storage clients 11 have no knowledge of the existence and operation of the error recovery scheme, there is no limitation from the client side to storage system scalability. On the server side, since the error recovery data computation is asynchronous and distributed according to a simple computational algorithm, there is no requirement for storage server synchronization, and therefore, no intrinsic scalability constraint.

The scheme for failure protection and recovery that is the current invention is implemented on a complement of networked computers that are acting as storage servers 17. Each of the servers 17 has attached to it a pool of physical storage devices 13 that hold data that is being accessed by any number of independent client computers 11 also connected to the storage servers 17 through a network. Each of the storage server computers 17 contributes all or part of its complement of physical storage 13 to an aggregated pool of storage that appears to each of the clients 11 as a single virtual shared storage pool. The storage aggregation layer is implemented by software that runs on the storage client computers 11 of the system and may be of any design, such as that of a global file system or a Storage Area Network (SAN) aggregation layer. The sufficient condition for the storage aggregation layer is that it be able to contact the storage server computers 17 over a suitable computer communications network, and issue data access requests to the appropriate storage servers 17 using a communications protocol that is supported for such purposes by the software running on the storage servers 17. One example of such an implementation is a storage aggregation layer that implements a global file system and uses the standard iSCSI protocol to issue data access requests over a standard Ethernet communications network using the well known TCP/IP protocol.

In the preferred embodiment of the current invention, the storage servers 17 are connected to each other using a separate computer communications network that is distinct from the network that connects to the storage clients 11. This embodiment is not essential to the operation of the invention, but rather provides for enhanced system performance. The sufficient condition of the networking infrastructure is that all of the storage servers 17 should be able to establish and maintain bi-directional communications links between each other. One example of such a computer communications network is an Ethernet network running the standard and well known TCP/IP communications protocol. There are many other possible protocols and networks that could also be used for an embodiment of the current invention, which are well-known to those skilled in the art.

In the preferred embodiment of the present invention, each of the storage server computers 17 runs computer software that implements 2 processing functions. The storage server process is responsible for receiving data access requests from the storage client computers 11 via the computer communications network that links the client 11 and server 17 computers together. The error recovery process is responsible for receiving error recovery data generation and data block recovery requests from the storage server process and for performing the requested error recovery data-related operations.

The storage server process receives data access requests from the storage clients 11 and acts on these requests by performing the requested operation and returning the storage clients 11 the results of the operation. Data access requests may be either read requests or write requests. Under normal operating conditions, when there has been no failure of a storage server 17, the result of a read request received by the storage process on a storage server 17 is that the requested data block is read from the storage device 13 and sent back over the computer communications network to the storage client 11 that initiated the request.

When one of the storage servers 17 in the pool of storage servers fails and becomes unable to respond to client-initiated data access requests, the data held on the local storage 13 of that failed server cannot be used to respond to such requests. During the duration of a single storage server 17 failure, both client-initiated read and write requests can be handled by remaining storage servers 17 in the storage pool.

The failure of a storage server 17 is detected by the storage aggregation software that runs on the storage client computers. Typically, a client 11 will recognize the failure of a storage server 17 as the failure of a data access request to complete without an error indication. In the preferred embodiment of the current invention, the failure of a storage server 17 is recognized by the instance of a failure of the communications path between the storage client 11 and the storage server 17. Other possibilities exist for the detection of storage server 17 failures, including, but not limited to, the use of periodic polling of the storage server 17 status, the use of specialized hardware that can detect storage server 17 failures and report them to the clients 11, and the use of the facilities of certain network hardware and software implementations that can indicate storage server 17 failures.

Once a failure is recognized, data access operations can continue for both read and write requests as long as the number of servers in the storage server 17 pool is depleted by only the single failed server 17.

There are 2 cases of relevance for a data access request originating from a storage client 11:

If the failed storage server 17 is the server responsible for the ERDB for the relevant data block, the operation is handled completely by the storage server process on the relevant storage server 17. Parity is not computed.

If the failed storage server 17 is the one that holds the relevant data block, then the client reroutes the request to the storage server 17 responsible for the ERDB of the relevant block.

In the former case, neither read nor write operations pose any particular constraint on the operation of the storage scheme, as the storage server 17 that is responsible for the relevant data block can handle the requested operation using its own local storage pool. In the latter case, the storage server 17 that holds the ERDB for the relevant block can handle the request by making use of the ERDB and the other data used to compute the ERDB held on other running storage servers 17 to either recover the contents of the data block on the failed storage server 17 and thereby respond to a read operation request, or to update the ERDB block itself, thereby responding to a write request.

In the case of a read request, recalling that if:

ERDB=A XOR B XOR ... then

A=ERDB XOR B XOR C ...

where the A, B, C etc are the contents of the data blocks that form the ERDB stripe on the storage servers 17 of the storage pool, it can be seen that the contents of the data block on a failed server can be recovered by using this mathematical relation simply by having the storage server 17 that is responsible for the ERDB block for a specified data block on a failed server contacting the other servers, retrieving the relevant data from them, and using the ERDB for the block, recover the contents of the block on the failed server. The recovered data block can then be returned to the client 11.

In the case of a write operation request, the ERDB can be updated by first recovering the contents of the data block using the remaining functioning storage servers 17, computing the new ERDB block using the contents of the new data block, and updating the ERDB block on the local storage of the ERDB server. While system performance is degraded due to the requirement to recover data from the other servers of the server pool, the incidence of write operations is handled even when the target storage server 17 for a write operation is not functional.

Once a failed storage server 17 that has failed has been brought back into operation, the contents of the data blocks and ERDB blocks that are held on its local storage can be verified and brought up to date as required using the ERDB algorithm. Typically, a recovery process is started on the newly repaired server that proceeds to verify the contents of the local storage of the server by contacting the other servers of the storage pool and using the data and ERDB blocks thereby available to update recover the valid contents of the data and ERDB blocks on the server's storage pool and to update them as needed.

Some improvements in the efficiency of the recovery operation can be attained by allowing the newly restored server to handle write operations, and read operations for any data and ERDB blocks that have been updated since the restoration of server operation. For all other blocks, resynchronization operations proceed in background and asynchronously to the routing operations of the storage server 17 pool.

A pool of storage servers 17 can be configured to include one or more spare servers which, during normal operations, do not participate in the data access operations of the storage pool. When any component of the storage system detects the failure of a storage server 17, one of the available spare storage servers can be used to replace the failed server 17. A suitable messaging protocol between the components of the storage system is used to inform all components of the need to replace the failed server with the spare server. The ERDB process on the spare server will then initiate a recovery operation that will synchronize the contents of the local storage 13 on the spare server. Once its local storage has been synchronized, the spare server proceed to handle all client-initiated data access operations as if it was the storage responsible for the data blocks held on its local storage pool.

Implementation of the scheme that embodies the current invention makes use of specialized communications protocols between the storage processes and ERDB processes running on the storage servers 17 of the storage system. In the preferred implementation of the current invention, 2 communications protocols are used, one between storage processes and ERDB processes running on the storage servers 17, and the other between ERDB processes on distinct storage servers 17.

The storage process to ERDB process communications protocol is used when a storage process receives a write operation on a data block that is held on the local storage of the storage server 17 receiving the request. The format of the messages sent from the storage process to the ERDB process is

[mesg id][starting lba sizeof(int)][offset within the block sizeof(int)][len sizeof(int)][data of len size]

where mesg_id can be one of the following:

MESG_ERDB_WRITE_REQ: A write has been received by a storage process, the ERDB process contacts the ERDB process on the storage server 17 responsible for the ERDB of the relevant data block MESG_DATA_WRITE_REQ: A write request is received by a storage process. The storage process asks the ERDB to calculate the old block as well as apply the write to it.

In failure mode, the following message can be sent by a server process to a ERDB process on another storage server 17

[mesg id][starting iba sizeof(int)][offset within the block sizeof(int)][len sizeof(int)]

where mesg_id can be:

MESG_DATA_READ_REQ: A server process has received a read request from a storage client and asks a ERDB process to service it by calculating the requested block contents with ERDB and other required data blocks.

These messages are responses from the ERDB process to a storage process. The format of each message is unique to the message. The possible responses and their formats are:

MESG_ERDB_WRITE_RESP: Only the data block address is sent to gt as a confirmation of completion

[mesg id][lba sizeof(int)]

MESG_DATA_READ_RESP: The response to a read request, the data block address, offset and length are sent back with the data.

[mesg id][lba sizeof(int)][offset sizeof(int)][len sizeof(int)][data len]

MESG_DATA_WRITE_RESP: The response to a write request, the data block address, offset and length are sent back without any data.

[mesg id][lba sizeof(int)][offset sizeof(int)][len sizeof(int)]

These messages are used by the ERDB processes on the storage servers 17 to communicate with each other. The general format of these messages is

[mesg type id][parameters]

The available messages and their format are:

This message is sent from a ERDB process that got a modify-read write request from its storage process to another ERDB process on another storage server 17 requesting the modification of a ERDB block

[type id is 0][lba sizeof(int)][offset sizeof(int)][len sizeof(int)][data len]

This message is a request for data, used for reconstruction by a ERDB process who wants the receiving ERDB process to read a specific data block from its local storage container.

[type id is 1][lba sizeof(int)][offset sizeof(int)][len sizeof(int)]

The following messages are responses to the preceeding messages:

Response to a ERDB update message is of the format

[type id is 10][lba sizeof(int)][data requested len]

Response to a data block request is of the format

[type id is 11][lba sizeof(int)][data requested len]

Now, with respect to FIG. 10-16, a second algorithm according to the present invention will be described.

Figure 10:
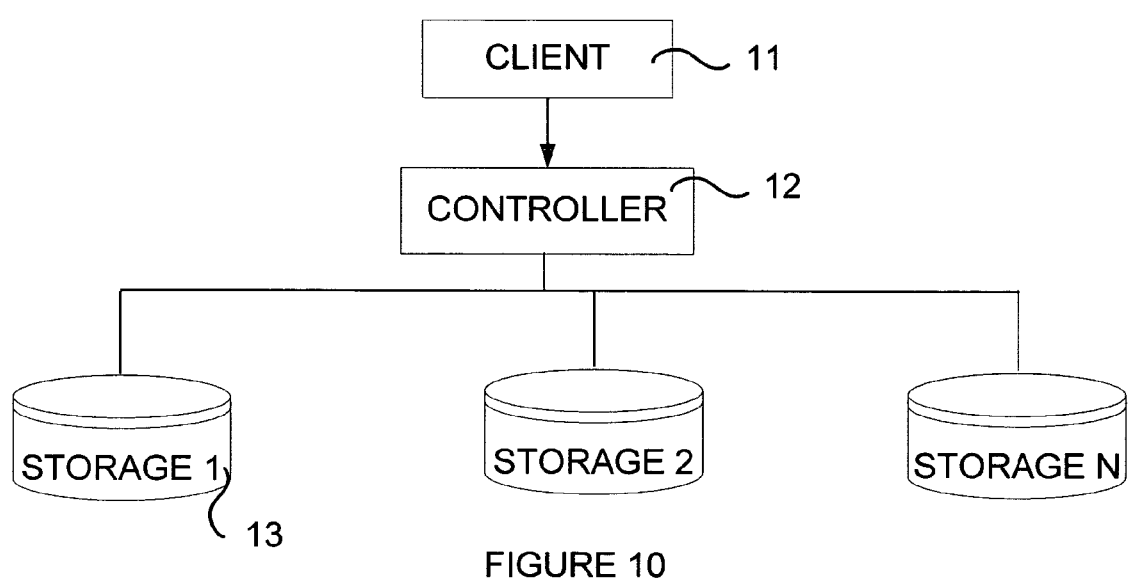
FIG. 10 is a block diagram of a second system architecture in which a client issues access requests to a storage controller.

FIG. 10 displays an embodiment of a first implementation of a storage system suitable for use with the present invention. A computer system that acts as a client 11 is connected to a storage controller 12 through a computer interconnection that is capable of the bi-directional transfer of information between the client and the controller. The storage controller 12 is connected to a number of storage devices 13 which make up a RAID group.

An application running on the client 11 computer initiates requests for either the storage of data on the storage devices 13 connected to the storage controller 12 (i.e. a WRITE request), or the retrieval of information already stored on the storage devices as a result of some previous WRITE requests (i.e. a READ request). The storage controller 12 responds to WRITE requests by storing the data sent by the client 11 computer on the storage devices 13. The storage controller 12 responds to READ requests by retrieving the data from the storage devices 13 and transmitting the data back to the client 11 computer.

The storage controller 12 may respond to other types of requests originated by the client 11 computer which are not specifically related to the transfer of data either to or from the storage devices 13. The storage controller 12 may, for example, respond to requests from the client 11 computer about the amount of available storage on the storage devices 13, the types and characteristics of the storage devices 13, and the operational readiness of the storage devices 13 to process data access requests.

The computer communications connection that is used between the client 11 computer and the storage controller 12 may be of any type, including direct connection to the client computer's main internal data transfer bus, a direct serial or parallel cable connection between an interface to the client computer's internal data transfer bus and the storage controller 12, a general purpose computer network connection such as an Ethernet based connection, or any other form of computer communications network that supports bidirectional transfer between the client 11 computer and the storage controller 12.

While in FIG. 10 a single client 11 computer is shown in communication with the pool of storage devices 13, in other embodiments of the present invention, the client 11 computer would be one of a plurality of client computers issuing access requests for data blocks stored on the storage devices 13.

The storage pool consists of the storage controller 12, a connection network that connects the storage controller 12 to the storage devices 13, and any number of storage devices 13. Within the storage pool there are N independent storage devices 13.

The storage controller 12 may be a general purpose computer system, or may be a special purpose computing device or electronic device that implements the storage algorithm of the present invention. The storage controller 12 is connected to the storage devices 13 via a computer communications network that is capable of bi-direction data transfer between the storage controller 12 and the storage devices 13. The computer communications network may be of any suitable form, including a direct interface between the storage controller 12 and the storage devices 13, direct cable connections between the storage controller 12 and the storage devices 13, or the use of a general purpose computer communications network such as an Ethernet network to connect the storage controller 12 and the storage devices 13.

The storage devices 12 are independent storage units that are capable of the storage and retrieval of information. The storage devices 13 may be general purpose computer systems themselves, or may be storage devices 13 such as rotating disk units, memory devices or communications networks. The sufficient condition of the storage devices 13 is that they be able to respond to data access requests from the storage controller 12 that are of the types WRITE, where data is to be stored on the device 13, and READ, where data previously stored on the device 13 is to be retrieved and sent back to the storage controller 12.

Data transferred between the various components of the system is in the form of data blocks. A data block is a collection of binary data elements commonly referred to as bytes. The size of a data block is the number of bytes in the data block. The current invention operates on the basis of the use of 2 block sizes, the internal block size and the external block size. The internal block size is the number of bytes contained in a data block that the storage controller 12 sends or receives from the storage devices 13. The external block size is the number of bytes in a data block that is transferred between the storage controller 12 and the client computer 13.

In the preferred embodiment of the present invention, the internal block size of the storage system is related to the external block size of the system by the following relation:

Internal Block Size=External Block Size/(*N*−1)

where N is the number of storage devices in the storage pool that make up a RAID group. Typically, the internal block size will be related to the physical characteristics of the storage devices 13 being used for the implementation of the storage system, but may also be a choice based on some other criterion suitable for a specific storage system configuration and implementation. For example, where ordinary rotating disk systems are used as the storage devices, the internal block size is usually 512 bytes. A network storage device, however, may use an internal block size of 4096 bytes.

In one embodiment of the present invention, data blocks that are to be written to the physical storage in the storage pool are sent to the storage controller 12 to which the storage devices 13 are connected. The data blocks must contain a number of bytes of data that is, as a minimum, equal to the 1 less than the number of storage devices in the storage pool. For performance reasons, the preferred implementation of the current invention uses block sizes that are multiples of the internal block size.

Figure 12:
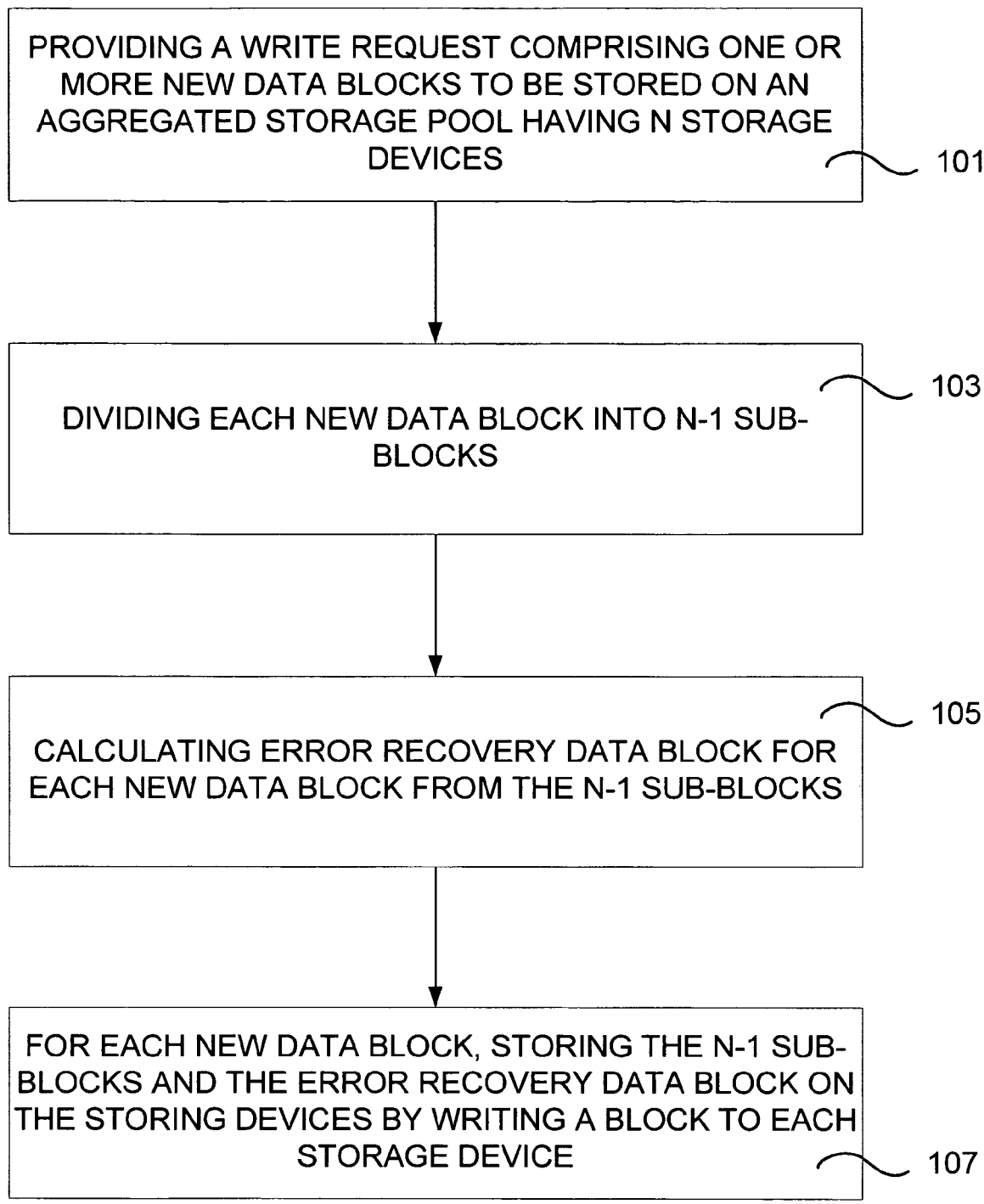
FIG. 12 is a flow chart of a method for executing a write request by dividing data blocks into sub-blocks according to one embodiment of the present invention.

Now, with respect to FIG. 12, a method of executing a write request will be described according to one embodiment of the present invention. A block of data is to be written to a storage pool that contains N independent storage devices 13. In a first step 101, the client issues a write request comprising one or more new data blocks to be stored to the storage pool. When the write request and the data blocks arrive at the storage controller 12, each of the new data blocks is divided into N−1 sub-blocks as per step 103. In the preferred embodiment of the present invention, sub-blocks are of equal length. In a next step 105, for each data block to be stored, the RAID algorithm is used to calculate an error recovery data block (ERDB) from the N−1 sub-blocks. Then, in step 107, for each data block, the N−1 sub-blocks and the ERDB are each written to a storage device 13.

In one embodiment of the present invention, one of the storage devices 13 in the storage pool is designated as a special device that only stores ERDB blocks. In this implementation, all of the ERDB blocks generated by the storage algorithm are stored to the ERDB device, while the data blocks are scattered over the N−1 remaining devices 13 of the storage pool.

In another embodiment of the present invention, the data blocks and the ERDB block are scattered over all storage devices 13 of the storage pool according to a scattering scheme. The method of storing the blocks in a scattered manner will now be described with respect to FIG. 14 and FIG. 15. The scattering of the data blocks is based on their Logical Block Address (LBA). The LBA of a data block is a number that identifies to the storage controller the location of a block of data in the storage space that contains all possible blocks. Each block has a unique LBA. The scattering of blocks over the storage devices 13 proceeds by making use of a portion of the LBA of a data block to look up the destination of the data blocks to be scattered in a scattering table. The size of the scattering table is determined by the number of storage devices 13 in the system. For example, for a storage system with 3 devices, the scattering table 131 might as shown in FIG. 15.

The LBA index value is computed by taking the modulus of the LBA with respect to the number of devices (N) in the RAID group. The result of this computation is a value that ranges between 0 and N−1. Since the storage pool has 3 storage devices 13, they can be labeled as device 0, device 1 and device 2, as seen in FIG. 14. When the storage algorithm is applied to a data block of a specified LBA, a dividing module 125 splits the data block into two sub-blocks, sub-block 1 and sub-block 2, of size equal to the internal block size of the system. The sub-blocks are transmitted to an error recovery data block (ERDB) generator 127 which computes the third block (block 3), the ERDB block. Therefore, each block has a numerical id (1, 2 or 3) associated to it. In order to retrieve the mapping of the blocks to the storage devices 13, the scattering table 131 is used. Reading along the row that corresponds to the LBA Index value yields the appropriate storage device 13 for each of the 3 blocks. The storage controller 12 sends, in parallel, over the network connecting the storage controller 12 to the storage devices 13, a WRITE request for each of the 3 blocks to each of the 3 storage devices.

Figures 14, 15:
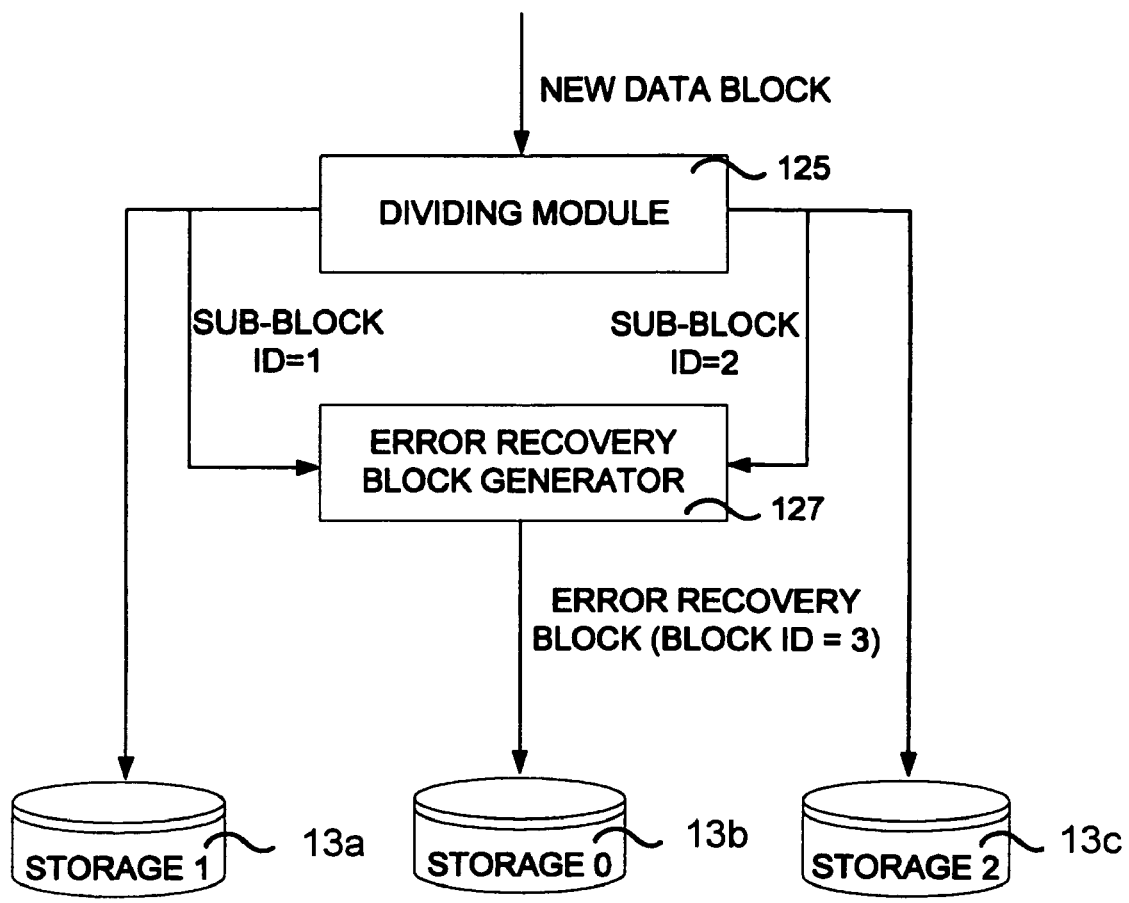
FIG. 14 is a block diagram of a system writing a new data block according to the method of FIG. 12.
FIG. 15 is a scattering table storing the mapping between sub-blocks and storage devices according to a preferred embodiment of the present invention.

In the example of FIGS. 14 and 15, the LBA index value is found to be "10", which corresponds the following mapping scheme: sub-block 1 is written to storage device 1, sub-block 2 is written to storage device 2 and block 3 (the ERDB) is written to storage device 0.

For systems that use more than 3 storage devices 13, the scattering table 131 will have more rows and columns. However, the principle of the scattering algorithm remains the same.

As part of the processing of the WRITE request originating from the client 11, the storage controller 12 creates a logical mapping between the LBA of the new data block being written, as supplied by the client 11 computer, and the LBAs of the sub-blocks that are actually written to the storage devices 13. The LBA supplied by the client 11 is an integer number that identifies the location of the data block to be written in a logical address space for data blocks that have a uniform size defined by the external block size of the storage system. Conversely, the locations of the sub-blocks actually stored on the storage devices 13 are specified in terms of the LBAs of blocks that have a size defined by the internal block size of the storage system. The LBA assigned to a sub block on a storage device 13 is defined by the relation:

$$LBAdevice = LBAclient$$

The computed value LBAclient is the location in the storage space of an individual storage device 13 for the component of the original data block, or the ERDB block, that is sent to the storage device 13 for storage.

Now, with respect to FIG. 13, a method for executing a read request will be described. In a first step 102, a client 11 provides a read request for a data block stored on an aggregated storage pool having N storage devices 13. In one embodiment on the present invention, the READ request originated by the client 11 arrives at a storage controller 12. Then, as per step 106, the storage controller 12 uses the LBA of the read request and the scattering table 131 to determine the LBA's of the sub-blocks that make up the contents of the data block being requested by the client 11. The scattering table 131 for the storage system is used to locate the storage devices 13 that hold the components of the block, and the storage controller 12 transmits a request to read those components from the storage devices 13, as per step 108. Then, in step 109, when the data sub-blocks arrive at the storage controller 12, the requested data block is assembled and transmitted back to the client 11.

In alternative embodiments of the present invention, the client 11 may issue a read request for a plurality of data blocks stored on the storage devices 13. In that case, the storage controller 12 would read a plurality of sub-blocks from each storage device at a time.

If, when trying to read a data sub-block from a storage device 13, a failure is detected, the present invention protects data against loss caused by the failure of 1 of the N storage devices 13 in the storage pool. A device is failed when, due to the failure of the storage device 13 itself, or the failure of the communications path between the storage device 13 and the storage controller 12, the storage controller 12 is unable to write data to the storage device 13 or read data from the storage device 13.

Figure 16:
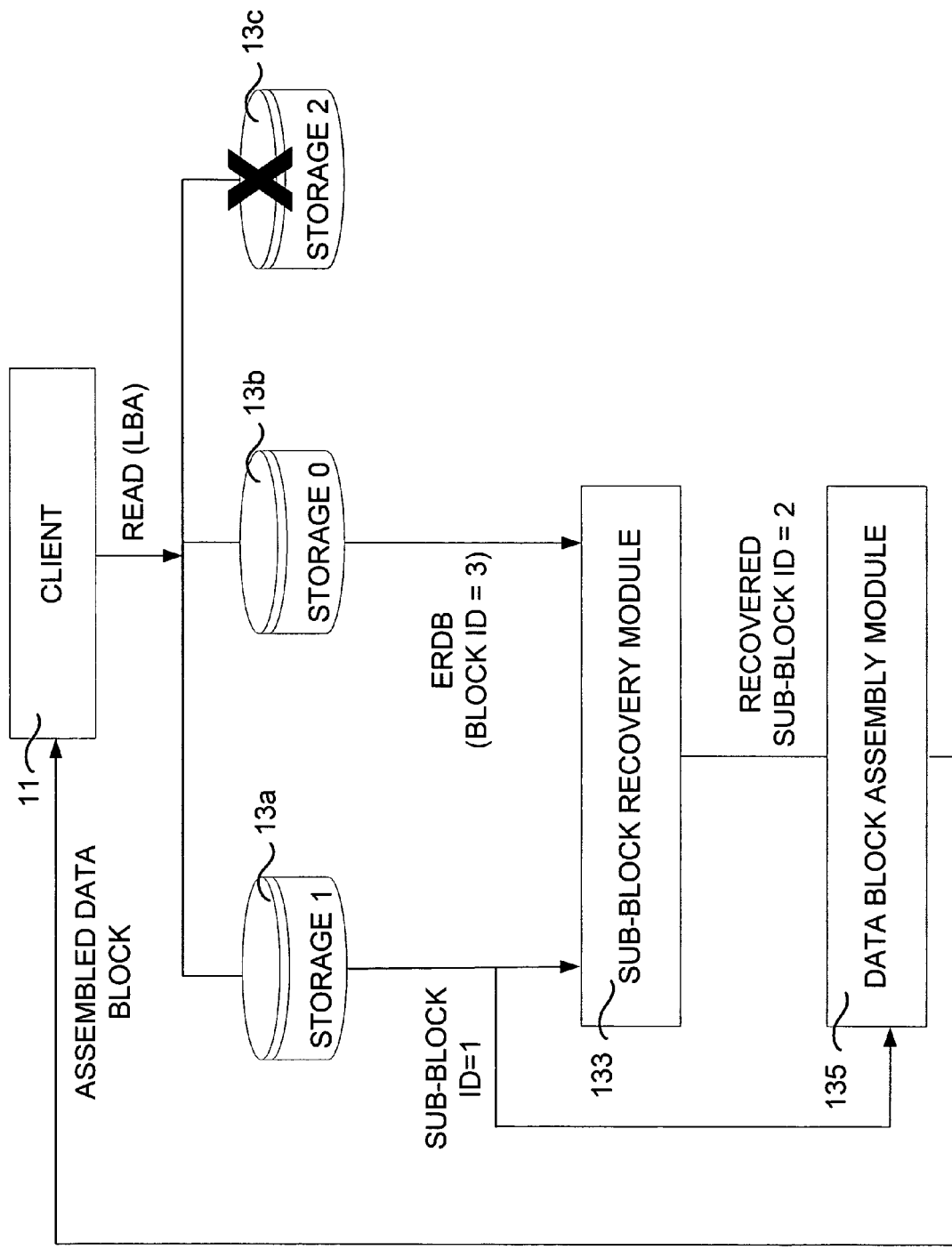
FIG. 16 is a block diagram of a system reading a data block according to the method of FIG. 13.

With respect to FIG. 16, the situation in which a client 11 issues a read request for a data block located at an address given by the LBA will be described, in the particular case that a storage device 13c fails. The scattering table of FIG. 15 is consulted to locate the mapping of the sub-blocks to the storage devices 13, so that the sub-blocks may be retrieved. Since the sub-block stored on the failed storage device 13c cannot be retrieved, the other N−2 sub-blocks and the ERDB will be read in order to recover the lost sub-block. In FIG. 16, the requested data block had been split into two sub-blocks which were stored on storage device 13a and storage device 13c, and the ERDB block was stored on device 13b. Sub-block 1 is read, as well as the ERDB block, and the two blocks are sent to the sub-block recovery module 133 which uses an error recovery algorithm to recover sub-block 2. The recovered sub-block 2 is then sent to a data block assembly module 135 in which the sub-block 1 and the recovered sub-block 2 are used to assemble the requested data block. After re-assembly, the data block is sent to the client 11 which issues the read request.

Figure 11:
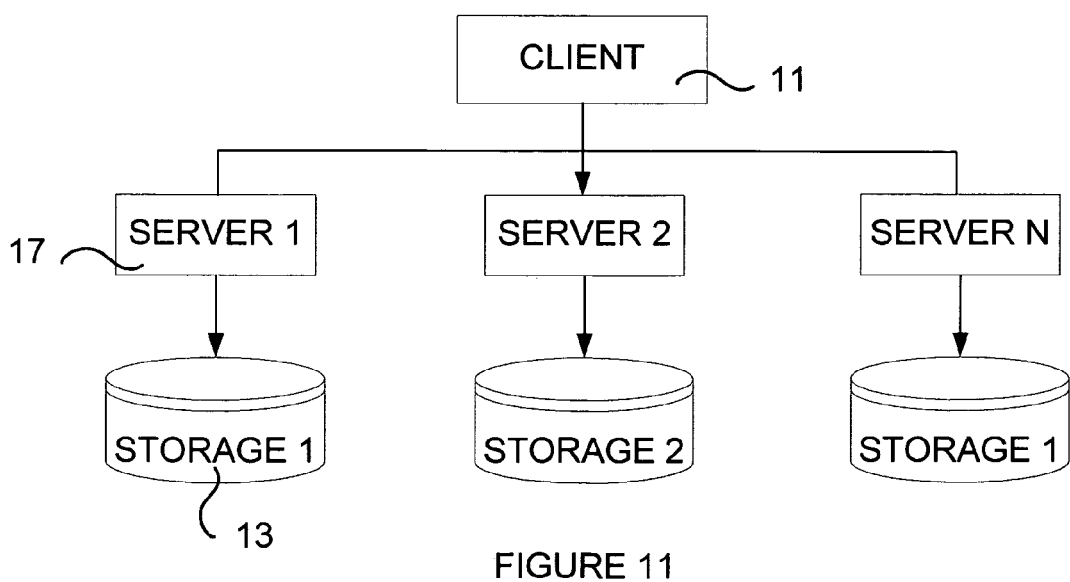
FIG. 11 is a block diagram of a third system architecture in which a client issues access requests to storage servers.

In the case in which the system comprises a storage controller 12, as shown in FIG. 10, it is the storage controller that consults the scattering table 131 and reads the sub-blocks and the ERDB block and then performs the recovery and assembly operations. In the case in which the system comprises a plurality of storage servers 17, as shown in FIG. 11, it is the storage server receiving the read request that performs all of the steps described above.

Figure 13:
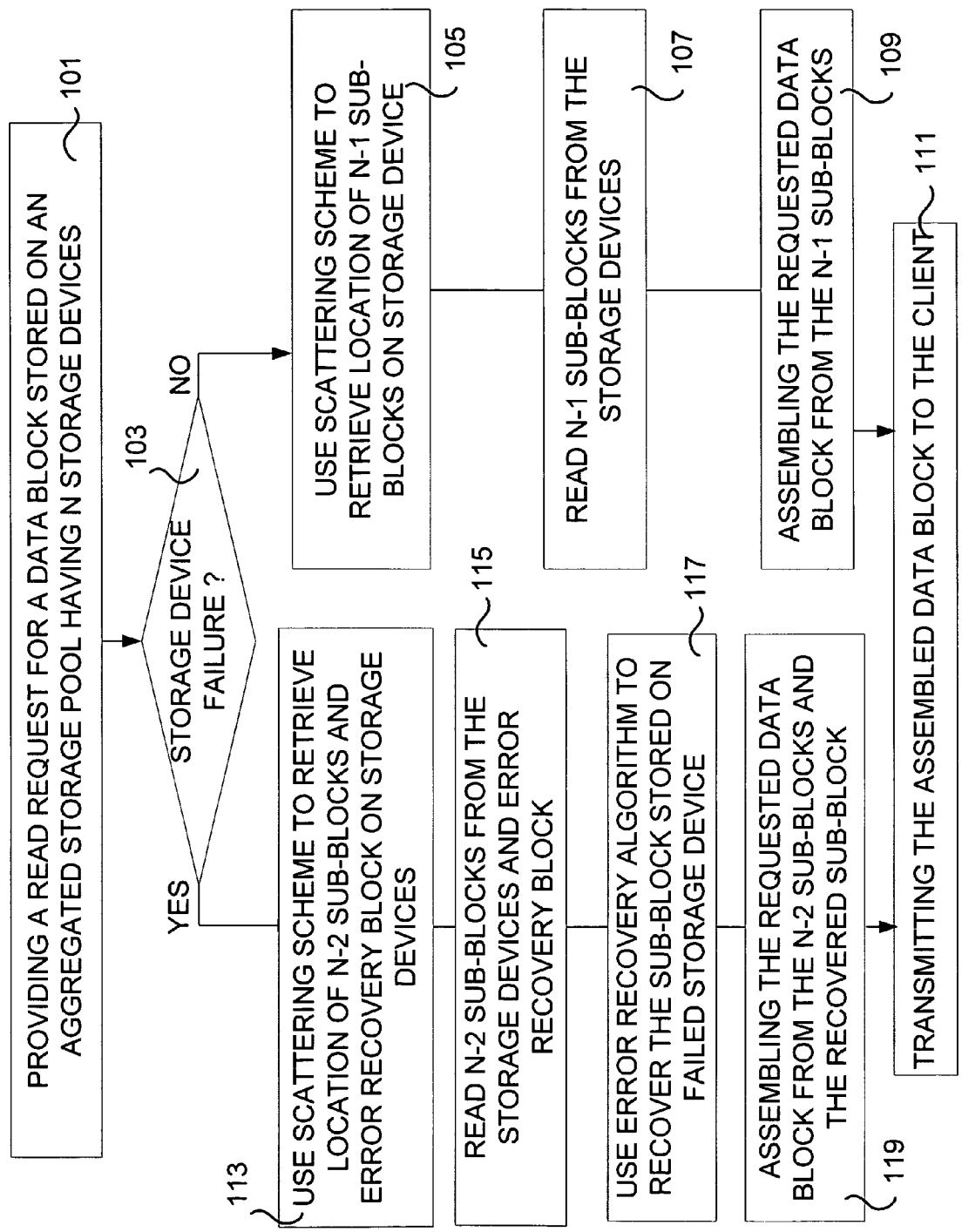
FIG. 13 is a flow chart of a method for executing a read request by re-assembling sub-blocks of the requested data block, according to one embodiment of the present invention.

As shown in FIG. 13, the storage algorithm employed by the storage controller 12, if failure during a read request is detected, handles one of two possible situations: either the storage device 13 handling the ERDB block is failed, or one of the storage devices 13 handling a sub-block component of the block requested by the client 11 has failed. In the former case, the entire contents of the requested data block can be read from the remaining storage devices in the system. In the latter case, as shown in FIG. 13, in a first step 113, the scattering table is used to retrieve the location of N−2 sub-blocks and the ERDB block on the storage devices 13. Then, in step 115, the N−2 sub-blocks and the ERDB block are read from the storage devices 13 and in step 117, the error recovery algorithm is used to recover the sub-block stored on the failed storage device 13. In step 119, the requested data block is assembled from the N−2 sub-blocks and the recovered sub-block. Finally in step 111, the assembled data block is sent to the client 11. All of the access operations to the non-failed storage devices 13 occur in parallel, so the performance of the storage system in failure mode is the same as the performance of the system in normal operating mode.

If a failure is detected during a write request, the storage controller 12 simply does not write the sub-block of the original data block to the failed storage device 13. The failed storage device 13 is either destined to receive an ERDB block, or one of the sub-blocks of the original data block sent by the client 11. Regardless of the situation, the storage controller 12 is able to write sufficient information to the remaining storage devices 13 to ensure that the complete original data block can be subsequently read back, or recovered using the error recovery algorithm. Since all write operations to the storage devices 13 occur in parallel, the performance of the system in failure mode is the same as the performance of the system in normal operating mode.

In order to perform data recovery following a failure, the present invention implements a modified scheme for data re-construction that maintains a map of the storage space of the device being re-constructed. Write operations for any block on the storage device 13 being re-constructed result in immediate restoration of the relevant blocks. The storage controller 12 also performs a sequential scan of the blocks on the newly restored device 13 and uses the error recovery algorithm to re-construct those not yet written to.

According to another embodiment of the present invention, the methods and algorithms described above can also be implemented in a clustered computing environment such as the one illustrated in FIG. 11. While in FIG. 11 a single client 11 computer is shown in communication with the pool of storage devices 13, in other embodiments of the present invention, the client 11 computer would be one of a plurality of client computers issuing access requests for data blocks stored on the storage devices 13. Such an architecture is shown for example in FIG. 2.

In a cluster implementation of the present invention, each of the storage servers 17 receives I/O requests from the client 11 computers and processes them according to the storage algorithm described above. A write request (of the external block size) is split into 2 parts, labeled A and B respectively. An error recovery block is computed over the parts A and B to result in a third data block, labeled C, equal in size (i.e. the internal block size) to the other 2 pieces of the incoming request. The parity C block is transmitted across the server network to the nearest neighbor on the left of the storage server 17 that received the I/O request, which stores the block on one of the storage devices 13 of the storage pool to which it has access. The part B data block is transmitted over the server network to the nearest server on the right, which stores the block on one of the storage devices 13 to which it has access. The part A block is stored by the server 17 that received the request on the one of the storage devices 13 to which it has access.

The necessary condition for the proper operation of the present invention is that the storage devices 13 used by the servers 17 be configured such that each server 17 has independent access to the storage devices 13 it uses to store the components of the I/O request for which it is responsible. The configuration of the storage devices 13 must be such that a server 17 has access to its storage devices 13 independently as to the operating status of the other servers 17 and independently of their storage devices 13.

In this implementation, the concepts of nearest neighbor, on the left, and on the right, apply in the sense of a pool of network connected computers. In a typical cluster environment, the network distance between participating computers is essentially equal. The sense of the concept nearest neighbor refers to an arbitrary, but unique, mapping between the computers on the network that designates which computers are adjacent for the purpose of defining an implementation of this concept. A feasible method of doing this is, for instance, to use numerically sequential network addresses for the servers 17 in the storage pool and define adjacent to mean having a network address within 1 of the current address. End cases associated with computers at the start and end of the numerical address sequence can be handled using modulo arithmetic to wrap around the end of the network address space. Other feasible schemes using configuration files or intrinsically neighborhood oriented network topologies can also be used.

The ideas implied by the terms on the right and on the left are, in the context of the present invention, arbitrary concepts. The present invention works equally well if the definitions of these terms are interchanged. In practical implementations of this invention, the actual definitions of these terms may have nothing at all to do with the physical placement of the servers 17, but be rather related to the choice of computer communications network used.

The handling of read requests originating from the clients 11 proceeds according to the storage algorithm as described above with respect to FIG. 13. A storage server 17 that receives a read request will retrieve part A of the requested data from its locally connected storage device 13, and part B of the requested data from the server 17 immediately to its right in the network sense. The combined response consists of the parts A and B concatenated into a single response block that satisfies the read request.

Operation in failure mode occurs when either a server 17 that is the object of an I/O request from a client 11 is not working or is not available for some reason, or when one of the nearest neighbors of the server 17 is not working or is not available. In the former case, the I/O request fails, and the client 11 must retry the request by sending it to an alternate server 17 that can handle the operation. In the latter case, the server 17 implements as much of the storage algorithm as is possible, writing the part A component to its local storage, and, if the nearest neighbor on the right is available, the part B to that server, or, if the nearest neighbor server on the left is available, writing the part C component to that server.

Logically, in this implementation, 3 storage servers 17 form a RAID group. The failure of any single server 17 within a RAID group is handled such that a write operation originating from a client 11 completes normally, because, using the features of the error recovery algorithm, the sub-block stored on a failed server 17 can be re-constructed from the remaining sub-block and the ERDB block.

The processing of read requests during failure mode operation proceeds in a similar manner. If the request is sent to a failed server 17, the operation fails on the client 11, which retries the operation by re-directing it to one of the neighbors of the failed server 17. The server 17 handling the request can then use the data from the remaining 2 servers 17 to re-construct the required data block.

The properties of the error recovery algorithm operate transparently on RAID groups of 3 or more storage servers 17. The choice of the number of servers 17 in a RAID group is related to implementation requirements for specific storage systems. The present invention requires only that the number of servers 17 in the RAID group be at least 3.

In one embodiment, the present invention describes an implementation of a mechanism to provide robust protection and recovery of data stored on storage pools that are constructed using clusters of storage servers 17. The purpose of constructing the storage pool using the cluster of servers 17 is to facilitate the construction of very high performance storage pools. The basis for the protection of the data against the failure of servers 17 is the use of an error recovery algorithm. This type of data protection approach is an instance of a general scheme for data redundancy protection known as Forward Error Correction (FEC) methods.

The preferred and feasible implementation of the present invention described here makes use of a basic error recovery algorithm that is capable of providing protection against a single server 17 failure within a RAID group. This error recovery algorithm represents only one possible implementation of the technique of the present invention. The scheme of the present invention works equally well with other error recovery algorithms that provide for data protection and recovery in the face of multiple server failures within a RAID group.

Data protection and recovery in the face of multiple server failure requires the generation of additional redundancy data and its distribution across additional, independent, storage devices 13 and servers 17. The storage algorithm of the present invention is readily extended to handle this type of implementation by increasing the minimum size of the RAID group, computing additional ERDB blocks, and scattering the blocks in a systematic manner over a wider pool of nearest neighbors. As described in the above, the implementation of the present invention is generally applicable to many possible redundancy schemes that are other instances of FEC methods.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method for executing a write request in a clustered computing environment, comprising a plurality of computers connected in a network, including at least one client computer accessing data blocks stored on a first storage device of a shared aggregated pool of storage devices:
    linking said data blocks stored on said first storage device to data blocks stored on at least one third storage device of said pool by error recovery data stored on a second storage device of said pool;
    said client computer sending a write request to a first storage server to store a new data block at an address on said first storage device;
    said first storage server writing said new data block at said address on said first storage device;
    calculating new error recovery data for said data block at a second storage server; and
    said second storage server writing said new error recovery data to said second storage device, wherein data is transmitted over said network to said second storage server to enable said writing;
    wherein each one of said first, second and third storage devices in said aggregated pool is readable and writable by a single storage server, and wherein each one of said first and second storage servers can read from and write to a single storage device in said aggregated pool; and
    wherein no failure of said first storage server is detected prior to said second server completing said writing.

2. A method as claimed in claim 1, wherein said calculating new error recovery data for said new data block comprises:
    reading an old data block previously stored at said address on said first storage device;
    calculating a difference data between said old data block and said new data block;
    sending said difference data to said second storage device;
    reading from said second storage device an old error recovery data associated with said old data block;
    calculating said new error recovery data from said old error recovery data and said difference data.

3. A method as claimed in claim 1, wherein said network comprises a first network for communication between said pool and said clients, and a second network for communication among said storage devices of said pool for communicating data relating to said error recovery data.

4. A method for executing a write request in a computing environment including a client computer accessing data blocks stored on an aggregated pool of a n−1 first storage devices and a second storage device, comprising:
    said client computer providing said write request comprising a new data block to be stored on said aggregated storage pool;
    dividing said new data block into n−1 sub-blocks;
    storing said n−1 sub-blocks on said n−1 first storage devices, wherein each one of n−1 first storage servers writes one of n−1 sub-blocks on one of said n−1 first storage devices;
    a second storage server calculating an error recovery data block for said new data block from said n−1 sub-blocks;
    said second storage server writing said error recovery data sub-block on said second storage device;
    wherein each one of said n−1 first storage devices and said second storage device in said aggregated pool is readable and writable by a single storage server, and wherein each one of said n−1 first storage servers and said second storage server can read from and write to a single storage device in said aggregated pool; and
    wherein no failure of said n−1 first storage servers is detected prior to said second storage server completing said writing.

5. A method as claimed in claim 4, wherein said write request is transmitted to a controller and wherein said dividing and said calculating is performed by said controller, further comprising said controller transmitting over a network said n−1 sub-blocks and said error recovery data to be written each to said second storage device.

6. A method as claimed in claim 5, wherein said write request is transmitted to a controller over a network.

7. A method as claimed in claim 4, wherein said client computer is one of a plurality of client computers accessing through a network data blocks stored on said said aggregated pool of n storage devices comprising said n−1 first storage devices and said second storage device.

8. A method as claimed in claimed 4, wherein said computing environment is a clustered computing environment, wherein access to said first storage device and said second storage device is controlled by said first storage server and n−1 second storage servers, a storage server from anyone of said first storage server and said n−1 second storage servers receiving said new data block to be stored, further comprising:
    said storage server dividing said new data block into n−1 sub-blocks and calculating error recovery data for said new data block from said n−1 sub-blocks;
    sending each one of said n−1 sub-blocks across a network to a neighboring storage server to be written to one of said first storage device and said n−1 second storage devices.

9. A method as claimed in claim 8, wherein said client computer is one of a plurality of client computers accessing through the network data blocks stored on said aggregated pool of n storage devices comprising said n−1 first storage devices and said second storage device.

10. A method as claimed in claim 9, wherein said network comprises a client network for communication between said aggregated pool and said client computers, and a server network for communication among said storage servers of said pool.

11. A method as claimed in claim 4, wherein one of said n−1 first storage devices and said second storage device is an error recovery storage device and wherein said error recovery data block is stored on said error recovery storage device.

12. A method as claimed in claim 4, wherein said n−1 sub-blocks and said error recovery data block are scattered all over storage devices of said aggregated pool of said n−1 first storage devices and said second storage device, the method further comprising:
    creating a scattering table mapping an identification of each one of said n−1 sub-blocks to one of said storage devices, said mapping corresponding to an index value;

computing the index value for said new data block to be written; and wherein said dividing said new data block into n–1 sub-blocks comprises:
providing the identification for each one of said n–1 sub-blocks;
using said index value to retrieve from said scattering table a mapping for said n–1 sub-blocks to said storage devices.

13. A method for executing a read request in a computing environment including a client computer accessing a data block and an error recovery data block stored on an aggregated pool of n storage devices, said data block being divided into n–1 sub-blocks, each one of said n–1 sub-blocks being written to a different one of n–1 first storage devices included in said n storage devices, according to a scattering scheme, and said error recovery data block being written to a second storage device included in said n storage devices according to the scattering scheme, the method comprising:
a client providing a request to read said data block stored on said n–1 first storage devices;
if no failure of any one of said n–1 first storage devices is detected,
using said scattering scheme to determine a location of each one of said n–1 sub-blocks on said n–1 first storage devices;
reading said n–1 sub-blocks, wherein each one of n–1 first storage servers reads one of said n–1 sub-blocks;
assembling said data block from said n–1 sub-blocks;
if one of said n–1 first storage devices storing one of said n–1 sub-blocks fails,
using said scattering scheme to determine the location of each one of n–2 sub-blocks from said n–1 sub-blocks on said n–1 first storage devices and another location of said error recovery data block on said second storage device;
reading said n–2 sub-blocks and said error recovery data block, wherein each one of n–2 of said n–1 first storage servers reads one of said n–2 sub-blocks, and wherein a second storage server reads said error recovery data block;
using an error recovery algorithm to recover said one of said n–1 sub-blocks stored on said one of said n–1 first storage devices which has failed;
assembling said data block from said n–2 sub-blocks and said one sub-block recovered;
transmitting said data block assembled to said client; and
wherein each one of said n storage devices is readable and writable by a single storage server, and wherein each one of said n–1 storage servers said second storage device can read from and write to only one of said n storage devices.

14. A method as claimed in claim 13, wherein one of said n–1 first storage devices is an error recovery storage device and wherein said error recovery data sub-block is stored on said error recovery storage device.

15. A method as claimed in claim 13, wherein said n–1 sub-blocks and said error recovery data block are stored according to a scattering table over said first storage devices, said scattering table mapping each one of said n–1 sub-blocks to one of said n–1 first storage devices, said mapping corresponding to an index value; wherein said reading said sub-blocks comprises:
providing the index value for said data block to be read;
providing a sub-block identification for each one of said sub-blocks;
using said index value and said sub-block identification to retrieve from said scattering table a mapping for said sub-blocks to said n–1 first storage devices;
using said mapping to read a sub-block from each one of said n–1 first storage devices.

16. A method as claimed in claim 13, wherein said client provides a read request for a plurality of data blocks and wherein said steps of reading said sub-blocks each comprise reading a plurality of said sub-blocks from each one of said n–1 first storage devices.

* * * * *